United States Patent
Kaneko et al.

(10) Patent No.: US 6,694,069 B2
(45) Date of Patent: Feb. 17, 2004

(54) OPTICAL INTEGRATED CIRCUIT SUBSTRATE AND OPTICAL MODULE

(75) Inventors: Katsuhiro Kaneko, Kyoto (JP); Shigeo Tanahashi, Kyoto (JP); Tokuichi Yamaji, Kyoto (JP); Shinichi Abe, Kyoto (JP); Yuriko Ueno, Kyoto (JP)

(73) Assignee: Kyocera Corporation, Kyoto (JP)

( * ) Notice: Subject to any disclaimer, the term of this patent is extended or adjusted under 35 U.S.C. 154(b) by 208 days.

(21) Appl. No.: 10/020,357

(22) Filed: Oct. 30, 2001

(65) Prior Publication Data

US 2002/0081056 A1 Jun. 27, 2002

(30) Foreign Application Priority Data

Oct. 30, 2000 (JP) .................................. P2000-331540
Dec. 26, 2000 (JP) .................................. P2000-395990
Jan. 29, 2001 (JP) .................................. P2001-020628

(51) Int. Cl.$^7$ ................................. G02B 6/12
(52) U.S. Cl. ................. 385/14; 385/129; 385/131; 385/141
(58) Field of Search .................. 385/14, 15, 49, 385/42, 129, 130, 131, 132, 141, 142, 143, 144, 145

(56) References Cited

U.S. PATENT DOCUMENTS

| | | | |
|---|---|---|---|
| 5,168,541 A | * 12/1992 | Booth ......................... | 385/129 |
| 5,253,319 A | * 10/1993 | Bhagavatula ................ | 385/129 |
| 5,271,083 A | * 12/1993 | Lebby et al. ................ | 385/130 |
| 5,307,357 A | * 4/1994 | Jost et al. ...................... | 372/7 |
| 5,416,870 A | * 5/1995 | Chun et al. ................... | 385/88 |
| 5,625,734 A | * 4/1997 | Thomas et al. ............... | 385/88 |
| 5,751,748 A | 5/1998 | Uejima et al. ................ | 372/31 |
| 5,917,980 A | * 6/1999 | Yoshimura et al. .......... | 385/129 |
| 6,324,328 B1 | * 11/2001 | Mehlhorn et al. ........... | 385/131 |
| 6,353,690 B1 | * 3/2002 | Kulishov .................... | 385/10 |
| 6,388,795 B1 | * 5/2002 | Fleming et al. ............. | 359/240 |
| 6,403,393 B1 | * 6/2002 | Adkisson et al. ............ | 438/31 |
| 6,489,177 B1 | * 12/2002 | Inomoto ...................... | 438/31 |

FOREIGN PATENT DOCUMENTS

| JP | 7-128531 | 5/1995 | ............... 385/14 X |
| JP | 8-330661 | 12/1996 | ............... 385/36 X |
| JP | 11-38279 | 2/1999 | ............... 385/14 X |

OTHER PUBLICATIONS

Kaneko et. al., "Optical Integrated Circuit..", U.S. patent application Publication No. U.S. 2002/0081056 A1, published Jun. 27, 2002.*

M. Siegert et al., "Efficient Optical Coupling Between a Polymeric Waveguide and an Ultrafast Silicon MSM Photodiode", Journal of selected topics in quantum electronics., vol. 4, No. 6, Nov./Dec. 1998. pp. 970–973.

Nan Marie Jokerst et al., "Thin–Film Multimaterial Optoelectronic Integrated Circuits", Transactions of Components, Packaging and Manufacturing Technology, part B, vol. 19, No. 1, Feb. 1996 pp. 97–106.

* cited by examiner

*Primary Examiner*—Brian Healy
(74) *Attorney, Agent, or Firm*—Hogan & Hartson

(57) ABSTRACT

An object of the invention is to provide an optical integrated circuit substrate capable of establishing optical connection between an optical waveguide and a semiconductor light-receiving element with high light-receiving efficiency and of achieving low-loss light transmission. In the optical integrated circuit substrate, on a substrate is formed an optical waveguide having a clad and a core layer. Embedded in the optical waveguide are a metal placement portion for an optical element and a thin-film optical element placed thereon. Distance between the thin-film optical element and the core layer is reduced. In a region free of the thin-film optical element, there is an adequate distance between the core layer and the substrate. This allows satisfactory optical connection between the thin-film optical element and the optical waveguide. In the thin-film optical element-free region, low-loss light transmission is achieved without interaction between transmitted light and the substrate.

14 Claims, 6 Drawing Sheets

OPTICAL INTEGRATED CIRCUIT SUBSTRATE AND OPTICAL MODULE

BACKGROUND OF THE INVENTION

1. Field of the Invention

The present invention relates to an optical integrated circuit substrate having an optical waveguide and a thin-film optical element which are integrated on the same substrate, more particularly to an optical integrated circuit substrate which is, like a WDM (Wavelength Division Multiplex) optical module substrate, suitably used for the case where a plurality of thin-film optical elements and other devices need to be mounted on the same substrate and in which miniaturization of the substrate, improvement of productivity, and enhancement of optical transmitting/receiving efficiency are achieved by integrating together an optical waveguide and a thin-film optical element on the same substrate.

The invention also relates to an optical module, which is used for an optical signal transmission system, having a semiconductor light-emitting element, an optical waveguide, and a monitoring semiconductor light-receiving element.

2. Description of the Related Art

In recent years, research and development have been under way on an optical element which lends itself to improvement of capability and productivity of an optical transmission module, and also on a technique for mounting an optical element with higher density, higher accuracy, and higher optical connection efficiency.

For example, "Thin-Film Multimaterial Optoelectronic Integrated Circuits" carried in "IEEE Transactions on Components, Packaging, and Manufacturing Technology, part B, Vol. 19, No. 1, February 1996" deals with a technique whereby an optical light-receiving element is grown epitaxially on a semiconductor substrate and thereafter only the resultant epitaxial layer is isolated therefrom so as to form a thin-film optical light-receiving element to be mounted on another mounting substrate. According to this technique, a thin-film optical element made of various materials can be mounted on a mounting substrate with higher density and higher accuracy.

Moreover, as an example of optical element mounting techniques, an optical integrated circuit substrate proposed in Japanese Unexamined Patent Publication JP-A 7-128531 (1995) is shown in section in FIG. 8. In FIG. 8, the optical integrated circuit substrate includes: a substrate 31; an optical waveguide 32 having a lower clad layer 34, a core layer 35, and an upper clad layer 36; and a surface light-receiving element 37, built as a thin-film optical element, disposed on the substrate 31 such that its light-receiving surface is covered with the lower clad layer 34. In this construction, an electromagnetic field of light propagating around the core layer 35 is spread out over the lower clad layer 34. This makes possible optical connection with the surface light-receiving element 37.

On the other hand, in the case where optical connection is established between the optical waveguide formed on the substrate and the thin-film optical element embedded in the optical waveguide, the following problem arises.

The thin-film optical element is composed solely of an epitaxial layer and thus has a thickness of no greater than several $\mu$m. Moreover, in a typical single-mode optical waveguide, difference in specific refractive index between the cladding and the core falls in a range of 0.2 to 1.5%, and the core has a thickness of about 4 to 8 $\mu$m. Here, to minimize the interaction between the substrate and light to be transmitted, the thickness of the lower cladding needs to be made more than 1.5 times as large as that of the core, more specifically, the lower cladding needs to have a thickness of about 6 to 12 $\mu$m. Meanwhile, to bring sufficiently high efficiency to the optical connection between the optical waveguide and the thin-film optical element arranged therebelow, the lower cladding of the optical waveguide needs to be made thin enough to reduce the distance between the core and the thin-film optical element.

Conventionally, after a thin-film optical element is formed or arranged on a substrate surface, an optical waveguide is formed thereon by coating. Accordingly, in the case where, after the thin-film optical element 37 is disposed on the substrate 31, an optical waveguide is formed thereon so as to achieve optical connection, as shown in FIG. 8, it is necessary to provide a curve or bend portion 38 in the optical waveguide 32 so that, of the lower clad layer 34, one part located above the thin-film optical element 37 is made thin, and the other part free of the thin-film optical element 37 is made thick. In this case, if the curve portion 38 has an unduly large curvature, the interaction between the substrate 31 and transmitted light occurs over a wider area in the vicinity of the thin-film optical element 37, which results in significant light transmission losses. By contrast, if the curve portion 38 has an unduly small curvature, although the interaction between the substrate 31 and transmitted light is prevented from occurring over a wide area in the vicinity of the thin-film optical element 37, transmitted light radiates over the curve portion 38, which results in significant light transmission losses and occurrence of stray light which causes cross talk.

JP-A 7-128531 further proposes, as Practical example 3, a construction fabricated in the following manner. A semiconductor layer of substantial height is used as a base substrate so that an active layer or a light absorbing layer acting as a thin-film optical element is located at a considerable distance from the substrate. Then, an optical waveguide is formed thereon by coating. In this construction, however, the core of the optical waveguide is significantly bent in the vicinity of the optical element. This causes radiation losses of light in the bend portion and also causes scattering losses of light in the optical element portion. Another problem with this construction is that, in forming an optical waveguide by coating, because of stepped configuration created due to the arrangement of the optical element, the process accuracy of the core of the optical waveguide is deteriorated, or it is difficult to form the coated or bend portion around the optical element into desired shape. This makes it impossible to obtain satisfactory performance capability as intended.

Moreover, for an optical signal transmission system, an optical module is used that includes: an optical waveguide formed on a substrate; a semiconductor light-emitting element arranged so as to be optically connected to the optical waveguide; and a monitoring semiconductor light-receiving element for detecting intensity of light which is emitted from the semiconductor light-emitting element and transmitted through the optical waveguide. The monitoring semiconductor light-receiving element serves to stabilize optical output from the semiconductor light-emitting element by monitoring the intensity of the light emitted from the semiconductor light-emitting element and then providing feedback for a driving circuit of the semiconductor light-emitting element.

Shown in FIG. 9 as a plane figure is a conventional optical module proposed in Japanese Unexamined Patent Publication JP-A 11-38279 (1999).

In the optical module shown in FIG. 9, on a substrate 41 is formed an optical waveguide 46 and mounted a semiconductor light-emitting element 47 (a laser diode is used here). The laser diode has two excitation ends composed of semiconductor cleavage planes. In addition, on the substrate 41 is mounted a monitoring semiconductor light-receiving element 42 opposed to one of the excitation ends. In this construction, backward light emitted from the semiconductor light-emitting element 47 (light to be monitored) is monitored by the semiconductor light-receiving element 42, and the output of the semiconductor light-emitting element 47 is so controlled as to be kept constant by an optical output level stabilizing circuit (not shown).

However, the above-described conventional optical module having the semiconductor light-emitting element 47, the optical waveguide 46, and the monitoring semiconductor light-receiving element 42 has the following various disadvantages.

First, in the case where an edge-emitting type laser diode is used as the semiconductor light-emitting element 47 and backward light emitted therefrom is monitored by the semiconductor light-receiving element 42, the optical output ratio between the forward and backward light emitted from the semiconductor light-emitting element 47 is not necessarily kept constant. Therefore, backward light output is detected by indirectly monitoring forward light output, which may result in inaccurate detection. To detect backward light output with accuracy by directly monitoring forward light output, forward emitted light should preferably be monitored.

To achieve this, as shown in FIG. 10 in section, Japanese Unexamined Patent Publication JP-A 8-330661 (1996) proposes an optical module employing a surface-emitting laser, wherein a beam splitter is inserted into an optical system through which forward emitted light in use travels and part of the forward emitted light is split by the beam splitter to create monitoring light.

In the optical module shown in FIG. 10, a beam splitter 58 is fixed to a light-emitting surface of a surface-emitting type semiconductor light-emitting element 57, and part of the laser beam emitted from the semiconductor light-emitting element 57 is split by the splitter to create monitoring light. Then, the monitoring light is detected by a semiconductor light-receiving element 52.

In this case, however, the beam splitter 58 is additionally required to split forward light for monitoring output, and this leads to an undesirable increase in the number of components or assembly process steps for constituting the optical module. This makes positioning for the optical system complicated and also makes the size of the optical module unduly large.

Moreover, assume that forward light emitted from a surface-emitting type semiconductor light-emitting element is monitored. In this case, unlike an edge-emitting type semiconductor light-emitting element, light is emitted only from one side of the surface-emitting type light-emitting element. Thus, to secure a path for directing light to a monitoring semiconductor light-receiving element, a beam splitter or the like needs to be arranged partway along a light transmission path, such as an optical waveguide or an optical fiber, to split an optical path. This complicates the structure or assembly process of the optical module and makes miniaturization of the optical module difficult.

SUMMARY OF THE INVENTION

An object of the invention is to provide an optical integrated circuit substrate capable of achieving low-loss light transmission and establishing satisfactory optical connection between a thin-film optical element arranged on the substrate and an optical waveguide formed thereon by coating.

Another object of the invention is to provide an optical integrated circuit substrate capable of achieving low-loss light transmission and establishing satisfactory optical connection between a thin-film optical element arranged on the substrate and an optical waveguide formed thereon by coating, and also provide an improved optical integrated circuit substrate which is impervious to being affected by external noise and in which reflection and losses of high-frequency signals inputted/outputted from a wiring conductor to the thin-film optical element are reduced.

Still another object of the invention is to provide an optical module having a semiconductor light-emitting element, an optical waveguide, and a monitoring semiconductor light-receiving element, which is capable of monitoring forward light emitted from the semiconductor light-emitting element with accuracy, and can be realized with higher productivity in a simple construction requiring fewer components.

The invention provides an optical integrated circuit substrate comprising:

a substrate;

an optical waveguide formed on the substrate, the optical waveguide having a cladding and a core;

a metal placement portion formed on the substrate; and a thin-film optical element placed on the metal placement portion, wherein the metal placement portion and the thin-film optical element are embedded in the optical waveguide.

According to the optical integrated circuit substrate embodying the invention, on the substrate is formed an optical waveguide having a cladding and a core. Within the optical waveguide is formed a metal placement portion for placing an optical element. A thin-film optical element is placed on the metal placement portion. Since the metal placement portion and the thin-film optical element are embedded in the optical waveguide, by reducing a distance between the thin-film optical element and the core of the optical waveguide, or by arranging the thin-film optical element within the core, optical signal transfer can be efficiently achieved between the optical element and the core. Moreover, in a region of the optical waveguide free of the thin-film optical element, an adequate distance can be secured between the core of the optical waveguide and the substrate. This makes it possible to establish satisfactory optical connection between the thin-film optical element embedded in the optical waveguide and the optical waveguide, and to achieve low-loss light transmission without being affected by the interaction between light transmitted through the optical waveguide and the substrate.

Moreover, the thin-film optical element is placed on the metal placement portion before it is embedded in the optical waveguide. Therefore, by dint of the metal placement portion, signal input and output, power supply, and heat conduction and dissipation are performed directly on the thin-film optical element with efficiency. This makes it possible to perform input and output of high-frequency signals and high-power optical signals with stability. As a consequence, a high-performance, highly-reliable optical signal operation can be realized that is excellent in high-frequency characteristics and operation stability.

Further, both of the metal placement portion and the thin-film optical element to be embedded in the optical waveguide can be fabricated in a thin-film forming process similar to an optical waveguide manufacturing process. This is advantageous in terms of high processing accuracy, high-density arrangement, and excellent productivity.

The invention further provides an optical integrated circuit substrate comprising:

a substrate;

an optical waveguide formed on the substrate, the optical waveguide having a cladding and a core;

a coplanar line including a line conductor dividedly extending on the substrate and grounding conductors formed on both sides of the line conductor so as to extend in spaced parallel relation to each other;

a metal electrode arranged differently in level than the line conductor, the metal electrode being electrically connected to the line conductor so as to bring the divided line conductor into conduction; and a thin-film optical element electrically connected to the metal electrode, wherein the metal electrode and the thin-film optical element are embedded in the optical waveguide, and wherein a horizontal distance between the metal electrode and the grounding conductor is made smaller than a horizontal distance between the line conductor and the grounding conductor.

According to the invention, in an optical integrated circuit, on a substrate is formed an optical waveguide having a cladding and a core, and a metal electrode and a thin-film optical element electrically connected to the metal electrode are embedded in the optical waveguide. In this construction, by reducing a distance between the thin-film optical element and the core of the optical waveguide, or by arranging the thin-film optical element within the core, optical signal transfer can be efficiently achieved between the optical element and the core. Moreover, in a region of the optical waveguide free of the thin-film optical element, an adequate distance can be secured between the core of the optical waveguide and the substrate. This makes it possible to establish satisfactory optical connection between the thin-film optical element embedded in the optical waveguide and the optical waveguide, and to achieve low-loss light transmission without being affected by an interaction between light transmitted through the optical waveguide and the substrate.

Moreover, the thin-film optical element is electrically connected to the metal electrode before it is embedded in the optical waveguide. Therefore, by dint of the metal electrode, signal input and output, power supply, and heat conduction and dissipation are performed directly on the thin-film optical element with efficiency. This makes it possible to perform input and output of high-frequency signals and high-power optical signals with stability. As a consequence, a high-performance, highly-reliable optical signal operation can be realized that is excellent in high-frequency characteristics and operation stability.

Further, both of the metal electrode and the thin-film optical element to be embedded in the optical waveguide can be fabricated in a thin-film forming process similar to an optical wave guide manufacturing process. This is advantageous in terms of high processing accuracy, high-density arrangement, and excellent productivity.

In the optical integrated circuit embodying the invention, the metal electrode and the divided line conductor of the coplanar line, being in existence at different levels, are electrically connected to each other. Moreover, the grounding conductors of the coplanar line are formed on both sides of the line conductor including a divided portion so as to extend in spaced parallel relation to each other. Further, a horizontal distance between the metal electrode and the extendedly-formed grounding conductor is made smaller than a horizontal distance between the line conductor of the coplanar line and the grounding conductor. This makes it possible to reduce the difference in impedance between the coplanar line and the metal electrode, and further to match the characteristic impedance of the former to that of the latter. Consequently, it is possible to achieve about 0.1 to 20% reduction in reflection and losses of high-frequency signals inputted or outputted to the thin-film optical element by the coplanar line, as well as about 0.1 to 20% reduction in external noise.

As described thus far, according to the invention, there are provided an optical integrated circuit substrate capable of achieving low-loss light transmission and establishing satisfactory optical connection between a thin-film optical element arranged on a substrate and an optical waveguide formed thereon by coating, and an improved optical integrated circuit substrate which is impervious to being affected by external noise, wherein reflection and losses of high-frequency signals inputted or outputted from a wiring conductor to a thin-film optical element are reduced.

In the invention, it is preferable that the optical waveguide is made of a siloxane polymer, fluorinated polyimide, fluorine resin, polymethylmethaacrylate (PMMA), or polycarbonate (PC).

In the invention, it is preferable that the metal placement portion is made of Au, Ti, Pd, Pt, Al, Cu, W, or Cr.

In the invention, it is preferable that on an outer surface of the metal placement portion is formed a soldered layer made of AuSn or AuGe.

In the invention, it is preferable that the thin-film optical element is built as a pn photodiode, a pin photodiode, a phototransistor, an MSM (Metal-Semiconductor-Metal) photodiode, an avalanche photodiode, a light-emitting diode, a vertical resonator type surface emitting laser, or an edge emitting laser.

The invention still further provides an optical module comprising:

a substrate;

an optical waveguide formed on the substrate, the optical waveguide having a cladding and a core;

a semiconductor light-emitting element arranged on the substrate so as to be optically connected to the optical waveguide; and a semiconductor light-receiving element arranged on the substrate so as to be optically connected to the optical waveguide, the semiconductor light-receiving element detecting light to be transmitted through the optical waveguide, the transmitted light being emitted from the semiconductor light-emitting element, wherein the semiconductor light-receiving element is disposed in a vicinity of the core with its light-receiving surface arranged parallel to a surface of the substrate so as to receive a transmitted light leak from the core of the optical waveguide.

According to the invention, an optical module comprises: a substrate having an optical waveguide formed thereon that includes a cladding and a core disposed inside the cladding; a semiconductor light-emitting element arranged on the substrate so as to be optically connected to the optical waveguide; and a semiconductor light-receiving element arranged on the substrate so as to be optically connected to the optical waveguide, the semiconductor light-receiving element detecting intensity, for example, of light to be transmitted through the optical waveguide, the transmitted light being emitted from the semiconductor light-emitting element. The semiconductor light-receiving element is disposed in the vicinity of the core with its light-receiving surface arranged parallel to the surface of the substrate so as to receive an evanescent wave of a leakage component of the transmitted light from the core of the optical waveguide. Accordingly, there is provided an optical module having a semiconductor light-emitting element, an optical waveguide, and a monitoring semiconductor light-receiving element, which is capable of monitoring forward light emitted from the semiconductor light-emitting element with accuracy without using an optical splitting element, such as a beam splitter, for splitting monitoring light for the forward emitted light, and can be realized with higher productivity in a simple construction requiring fewer components.

In the invention, it is preferable that the optical waveguide is made of a siloxane polymer, fluorinated polyimide, fluorine resin, polymethylmethaacrylate (PMMA), or polycarbonate (PC).

In the invention, it is preferable that the semiconductor light-receiving element is built as a pn photodiode, a pin photodiode, a phototransistor, an MSM (Metal-Semiconductor-Metal) photodiode, or an avalanche photodiode.

In the invention, it is preferable that the semiconductor light-emitting element is built as a laser diode, alight-emitting diode, a vertical resonator type surface emitting laser (VICSEL), or an edge emitting laser.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
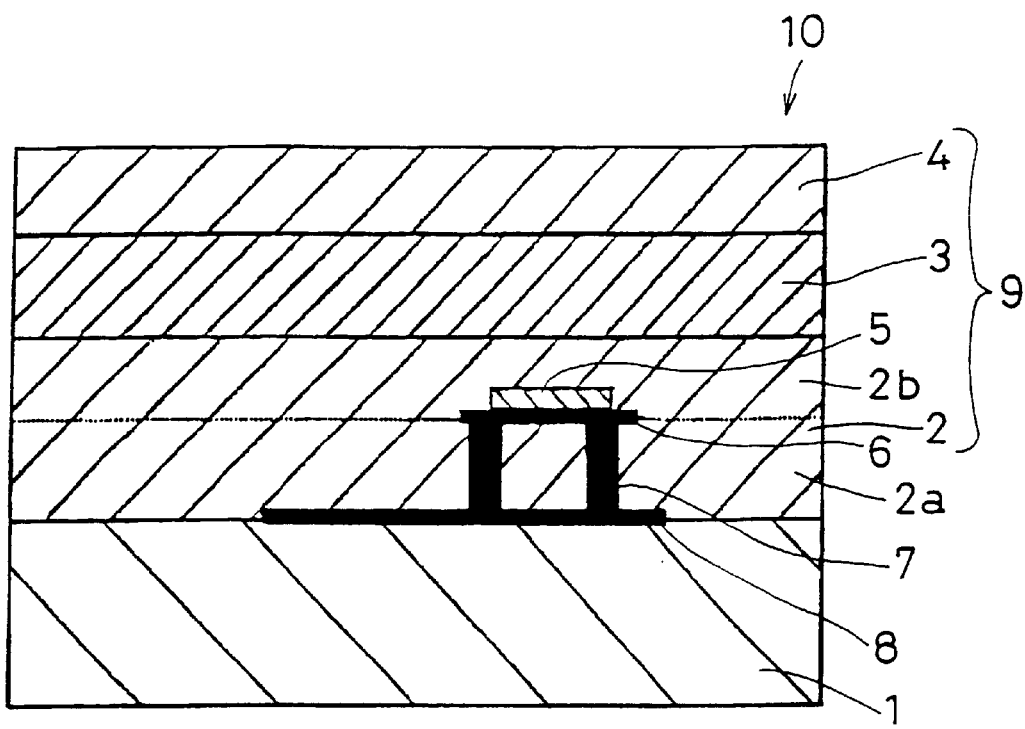
FIG. 1 is a sectional view of a first embodiment of an optical integrated circuit substrate according to the invention.

Now referring to the drawings, the optical integrated circuit substrate of the invention will be described below.

FIG. 1 is a sectional view illustrating one embodiment of an optical integrated circuit substrate according to the invention. In FIG. 1, an optical integrated circuit substrate 10 includes a substrate 1 and an optical waveguide 9 formed on the substrate 1. The optical waveguide 9 consists of a cladding and a core 3 embedded in the cladding. One part of the cladding constitutes a lower cladding 2, and the other remaining part constitutes an upper cladding 4. The optical integrated circuit substrate 10 further includes: a thin-film optical element 5; a metal placement portion 6 for placing the thin-film optical element 5; a through conductor 7; and a wiring conductor 8 formed on the substrate 1. The thin-film optical element 5 is electrically connected to the metal placement portion 6. The metal placement portion 6 is electrically connected to the wiring conductor 8 by the through conductor 7. An electric signal fed from the wiring conductor 8 is inputted via the through conductor 7 and the metal placement portion 6 to the thin-film optical element 5, and an electric signal fed from the thin-film optical element 5 is outputted via the metal placement portion 6 and the through conductor 7 to the wiring conductor 8.

In the optical integrated circuit substrate 10 of the invention, the metal placement portion 6 is formed within the optical waveguide 9, specifically, in this example, within the lower cladding 2. Likewise, the thin-film optical element 5, after being placed on the metal placement portion 6, is arranged within the optical waveguide 9, specifically, in this example, within the lower cladding 2. That is, both of the metal placement portion 6 and the thin-film optical element 5 are embedded in the optical waveguide 9. Note that the thin-film optical element 5 is formed either as a light-receiving element or as a light-emitting element. When formed as a light-receiving element, the thin-film optical element 5 should preferably be, as in the case of this example, embedded in the lower cladding 2 so as to be come closer to the core 3 to prevent optical signals propagating through the core 3 from being scattered or attenuated. By contrast, when formed as a light-emitting element, the thin-film optical element 5 should preferably be embedded in the core 3 so as for optical signals to be efficiently outputted to the core 3.

In the optical integrated circuit substrate 10 of the invention, the substrate 1 has photoelectric circuits formed thereon such as an electric circuit and the optical waveguide 9, and functions as a supporting substrate for the thin-film optical element 5 embedded in the optical waveguide 9. As the substrate 1 in question, it is possible to use various substrates designed to deal with optical signals, for example, an optical integrated circuit substrate, or an optical electronic type substrate. The examples thereof includes: a silicon substrate; an alumina substrate; a glass ceramic substrate; a multi-layer ceramic substrate; and a plastic electric wiring substrate.

The optical waveguide 9, which is formed on the substrate 1 and has the thin-film optical element 5 embedded thereinside, is built as a three-dimensionally shaped waveguide provided at least with a lower cladding 2 and a core 3, and preferably an upper cladding 4 formed thereon.

A material for use as the optical waveguide 9 should preferably be formable at a low temperature so as not to cause damage to the wiring conductor 8, the through conductor 7, the metal placement portion 6, of which each is formed on the substrate 1, and the thin-film optical element 5 placed on the metal placement portion 6 when the optical waveguide 9 is laminated thereon, be excellent in planarizing characteristics so as to smooth out asperities created on the surface due to arrangement of the wiring conductor 8, the through conductor 7, the metal placement portion 6, and the thin-film optical element 5, and be excellent in transparency so as to transmit light with lower losses. Moreover, the lower cladding 2 in particular functions also as a dielectric layer of electrical wiring in the optical integrated circuit substrate 10, and therefore it is particularly preferable to use a material which is low in dielectric loss and permittivity in preparation for high-frequency electric signals. Here, a material which can be applied to the substrate 1 as a solution is suitably used, such as a siloxane polymer, fluorinated polyimide, fluorine resin, polymethylmethaacrylate (PMMA), or polycarbonate (PC).

The optical integrated circuit substrate 10 of the invention is fabricated as follows. Firstly, as shown in FIG. 1, on the substrate 1 are formed the wiring conductor 8 and then a first layer 2a. The first layer 2a constitutes lower part of the lower cladding 2 of the optical waveguide 9 (as shown by the dotted line in FIG. 1) and on which the metal placement portion 6 for placing the thin-film optical element 5 is formed. Secondly, on the first layer 2a are formed the through conductor 7 connected to the wiring conductor 8 formed on the substrate 1 and the metal placement portion 6 for placing the thin-film optical element 5. Thirdly, the thin-film optical element 5 is placed or formed immediately on the metal placement portion 6. Fourthly, a second layer 2b constituting upper part of the lower cladding 2 is formed (as shown by the dotted line in FIG. 1). The second layer 2b covers the metal placement portion 6 and the thin-film optical element 5. Fifthly, a layer serving as the core 3 is formed on the lower cladding 2. The layer is thereafter formed into a predetermined shape by means of a known fine-processing technique, such as photolithography or RIE (reactive ion etching), whereby the core 3 is formed. Lastly, after the core 3 is finished, the upper cladding 4 is formed by coating. Eventually, a three-dimensionally shaped optical waveguide 9 is realized. The optical waveguide 9 thus obtained is designed such that the metal placement portion 6 and the thin-film optical element 5 are embedded in the lower cladding 2.

The metal placement portion 6 for placing the thin-film optical element 5, the through conductor 7, and the wiring conductor 8 are each formed from a known thin-film wiring conductor material such as Au, Ti, Pd, Pt, Al, Cu, W, or Cr by means of known thin-film multi-layer wiring methods. The size and shape of the metal placement portion 6 are determined in conformity with the size and shape of the electrode formed on the thin-film optical element 5. When the thin-film optical element 5 is a light-receiving element, the metal placement portion 6 is positioned within the optical waveguide 9 in such a way that the core 3 and the light-receiving surface are so arranged that electromagnetic field distribution of transmitted light is exerted upon the light-receiving surface. In a typical single-mode optical waveguide, the distance between the core 3 and the light-receiving surface needs to be made 1.5 times or less as large as the thickness of the core 3. In reality, the positioning is so determined as to obtain intended light-receiving efficiency by performing simulations or tests with consideration given to the refractive index, transmittance, and thickness of the thin-film optical element 5, the structure, refractive index, and thickness of the optical waveguide 9, the sensitivity of the light-receiving element, and the like. By contrast, when the thin-film optical element 5 is a light-emitting element, the metal placement portion 6 is positioned in such a way that the light-emitting portion is arranged within the core 3 so as for optical signals to be efficiently fed to the core 3.

Moreover, prior to placement of the thin-film optical element 5, a soldered layer such as AuSn or AuGe may be formed on the outer surface of the metal placement portion 6 for placing the thin-film optical element 5, if it is necessary in cases where the thin-film optical element 5 is bonded or electrically connected to the metal placement portion 6.

Moreover, in the example shown in FIG. 1, although the connection of the metal placement portion 6 formed within the lower cladding 2 is established by the wiring conductor 8 and through conductor 7 formed on the substrate 1, any other electric wiring structure may be adopted so long as it conforms to the specifications. For example, the metal placement portion 6 may be electrically connected to the circuit wiring formed on the optical integrated circuit substrate 10 with monolayer wiring structure or multilayer wiring structure, or may be connected to the wiring formed on the optical waveguide 9.

By placing the thin-film optical element 5 on such a metal placement portion 6, the stepped configuration created due to the arrangement of the thin-film optical element 5 can be made less prominent than in the construction disclosed as Practical example 3 in JP-A 7-128531. Specifically, the step height can be reduced to about 2 to 3 μm or below. Thus, when an optical waveguide layer is laminated on the thin-film optical element 5, the surface can be satisfactorily planarized. This significantly reduces scattering and radiation losses of light occurring in the vicinity of the optical element 5. Moreover, the core 3 of the optical waveguide 9 can be processed with high accuracy, so that excellent performance can be easily attained as designed.

The thin-film optical element 5 placed on the metal placement portion 6 is formed as a thin-film light-receiving element or thin-film light-emitting element with use of a semiconductor material such as Si, Ge, InP, GaAs, InAs, or InGaAsP. As a light-receiving element, a pn photodiode, a pin photodiode, a phototransistor, an MSM (Metal-Semiconductor-Metal) photodiode, an avalanche photodiode, or the like, and, as a light-emitting element, alight-emitting diode (LED), a vertical resonator type surface emitting laser, an edge emitting laser, or the like are used. Note that the thin-film optical element mentioned here is defined as the one having a thickness smaller than that of the lower cladding 2 or the core 3 in which the thin-film optical element is embedded.

When formed as a surface-receiving type light-receiving element, the thin-film optical element 5 is so arranged that a field of light propagating around the core 3 is exerted upon its light-receiving surface; when formed as an edge-emitting type light-emitting element, the thin-film optical element 5 is arranged with its light-emitting surface located within the core 3; and, when formed as a waveguide type light-receiving element, the thin-film optical element 5 is so arranged that a field of light propagating around the core 3 is exerted upon its end face. Such arrangements allow the thin-film optical element 5 to be optically connected to the optical waveguide 9. In addition, when the thin-film optical element 5 has a waveguide structure, the core 3 and the waveguide portion formed within the thin-film optical element 5 may be arranged parallel to each other so as to achieve mode connection. Optical connection can also be achieved in this case.

The positional relationship between the thin-film optical element 5 embedded within the optical waveguide 9 and the core 3 of the optical waveguide 9; the height, width, and refractive index of the core 3; the thickness and refractive index of the lower cladding 2; and the thickness and refractive index of the upper cladding 4 are so determined as to obtain intended optical connection efficiency on the basis of known theory of an optical waveguide, or by performing simulations or tests with the light-receiving sensitivity of the thin-film optical element 5, intensity or mode field of transmitted light, or other into consideration.

Note that, as a method for placing the thin-film optical element 5 on the metal placement portion 6, known thin-film element mounting methods maybe adopted, for example, a technique described in "Thin-Film Multimaterial Optoelectronic Integrated Circuits" carried in "IEEE Transactions on Components, Packaging, and Manufacturing Technology, part B, Vol. 19, No. 1, February 1996".

Hereinafter, a description will be given as to a specific example of the optical integrated circuit substrate 10 embodying the invention.

Firstly, on a silicon substrate 1 are formed electric wiring composed of a wiring conductor 8 made of Ti/Pt/Au (thickness: 0.1 $\mu$m/0.2 $\mu$m/0.8 $\mu$m, respectively) and a pad for permitting connection to outside by means of photolithography, electronic beam deposition, and lift-off method.

Secondly, an organic solvent solution of a siloxane polymer is applied to the substrate by means of spin-coat method and subsequently heating treatment is performed thereon at 85° C. for 30 minutes and at 270° C. for 30 minutes, whereby an 8 $\mu$m-thick first layer 2a constituting part of the lower cladding 2 (refractive index=1.4405; and $\lambda$=1.3 $\mu$m) is formed. Thereafter, in the first layer 2a is formed a through hole by RIE processing with use of an Al-film opening pattern as a mask. After the Al thin-film mask is removed, a Ti/Pt/Au thin film (thickness: 0.1 $\mu$m/0.2 $\mu$m/0.5 $\mu$m, respectively) is formed by means of electronic beam deposition, and then photolithography and dry-etching are performed thereon. Eventually, a thin-film light-receiving element 5 placement pad, i.e. the metal placement portion 6, is realized that is electrically connected to the pad for permitting connection to outside by a conductor within the through hole.

Thirdly, as the thin-film optical element, an MSM thin-film light-receiving element 5, which is composed of a 1 $\mu$m-thick GaAs type material and a 0.2 $\mu$m-thick Au electrode, is mounted on the thin-film light-receiving element 5 placement pad.

Fourthly, an organic solvent solution of siloxane polymer, which is the same material as used for the first layer 2a of the lower cladding 2, is applied to the substrate by a spin-coat method and subsequently heating treatment is performed thereon at 85° C. for 30 minutes and at 270° C. for 30 minutes, whereby a 10 $\mu$m-thick layer (refractive index=1.4405; and $\lambda$=1.3 $\mu$m) is formed. Thereafter, the entire surface thereof is subjected to etching by RIE processing using $CF_4$ gas and $O_2$ so as to give a thickness of 1 $\mu$m to a specific portion, which covers the thin-film optical element 5, of the second layer 2b constituting the remaining upper part of the lower cladding 2. Hereupon, in the lower cladding 2, the difference in height between the portion covering the thin-film optical element 5 and the other portion is kept as small as 0.3 $\mu$m or below and is thus considered immaterial. In the lower cladding 2 thus fabricated, the portion free of the thin-film optical element 5 has a thickness of about 11 $\mu$m.

Fifthly, a mixed solution of a siloxane polymer and tetra-n-butoxytitanium is spin-coated on the lower cladding 2, and is then heat-treated at 85° C. for 30 minutes and at 270° C. for 30 minutes, whereby a 7 $\mu$m-thick core 3 (refractive index=1.4450; and $\lambda$=1.3 $\mu$m) is formed.

Sixthly, a 0.5 $\mu$m-thick Al film is formed on the core 3 by means of sputtering, and a photo-resist pattern acting as a pattern for the core 3 is formed by means of photolithography. Then, the Al film is subjected to etching using a mixed solution of phosphoric acid, acetatic acid, and nitric acid, whereby an Al pattern is formed on to which the resist-pattern is transferred.

After the resist is removed, the core 3 is subjected to etching by RIE processing using $CF_4$ gas and $O_2$ gas, whereby a 7 $\mu$m-wide and 7 $\mu$m-high core 3 having an approximately rectangular section is formed. This core 3 is located above the light-receiving portion of the thin-film light-receiving element 5.

After the Al pattern is removed, likewise as the foregoing, an upper cladding 4 (refractive index=1.4405; and $\lambda$=1.3 $\mu$m) is formed in which the core 3 is embedded. Eventually, a step-index type optical waveguide is realized that has the lower and upper claddings 2 and 4 made of a siloxane polymer and the core 3 made of titanium-containing a siloxane polymer.

Lastly, excimer-laser abrasion treatment is performed so as to expose part of the pad for permitting connection to outside formed on the surface of the silicon substrate 1. Moreover, with use of a dicing blade, the substrate is cut into separate tip-like plates and is provided with a connection-permitting end face on which light coming from outside of the optical waveguide is incident.

In order to evaluate the light-transmission and light-receiving characteristics of the optical integrated circuit substrate 10 of the invention fabricated in that way, a laser light having a wavelength of 1.3 $\mu$m was fed via the single-mode optical waveguide to the end face for permitting connection to the optical waveguide.

As a result, it has been confirmed that, in a region of the optical waveguide 9 free of the thin-film light-receiving element 5, the thickness of the lower cladding 2 is made as large as 11 $\mu$m. This helps minimize the interaction between the lower cladding 2 and the underlying silicon substrate, so that low-loss and satisfactory light transmission is achieved. It has also been confirmed that the thin-film light-receiving element 5 receives light at about 10% efficiency, i.e. excellent optical connection efficiency can be attained.

It should be noted that the form of this invention herein shown and described is to be taken only as a preferred example, and the invention is not limited thereto. Accordingly, various changes and modifications may be made without departing from the spirit or scope of the invention. For example, the core 3 may be formed immediately on the surface of the thin-film light-receiving element 5 without providing therebetween the second layer 2b constituting the remaining upper part of the lower cladding 2. Moreover, a grating maybe formed in the second layer 2b of the lower cladding 2 between the thin-film light-receiving element 5 and the core 3 so as to obtain additional functions such as wavelength division.

However, in the optical integrated circuit substrate 10 of the above-described embodiment, depending upon the design of the high-frequency circuit corresponding to the metal placement portion 6 for placing the optical element 5, undesirable reflection may occur in input and output signals from the optical element 5 due to a characteristic impedance mismatch between the metal placement portion 6 and the through conductor 17, or between the metal placement portion 6 and the wiring conductor 8. In addition, the optical integrated circuit substrate 10 is susceptible to external noise due to the characteristic impedance mismatch.

Shown in FIGS. 2 to 6 is another embodiment of the optical integrated circuit substrate of the invention that has been made to cope with such inconveniences.

Figure 2:
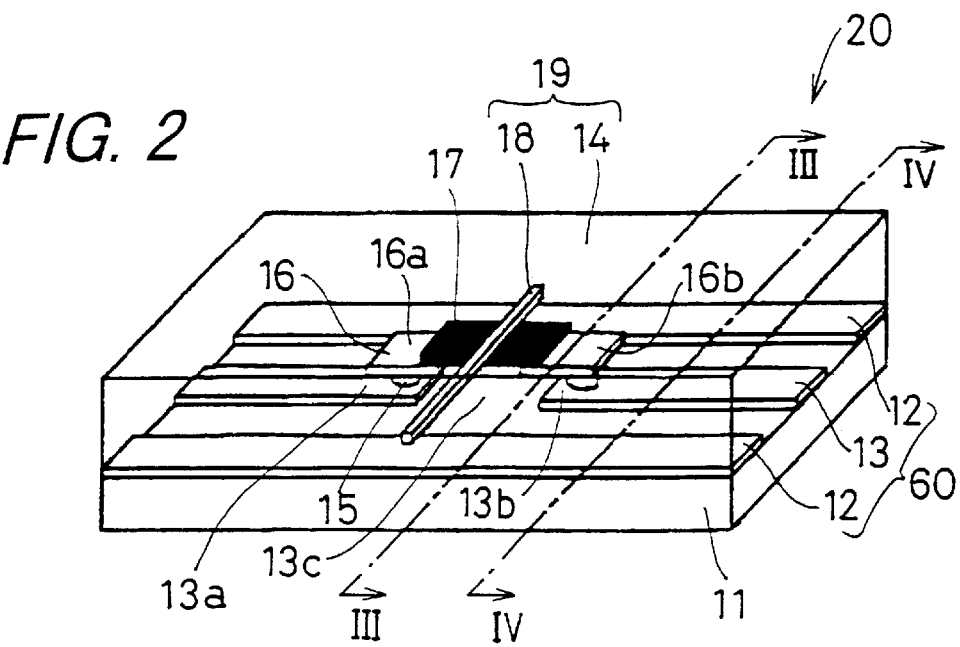
FIG. 2 is a perspective view of a second embodiment of an optical integrated circuit substrate according to the invention, illustrating the internal structure thereof.
Figure 3:
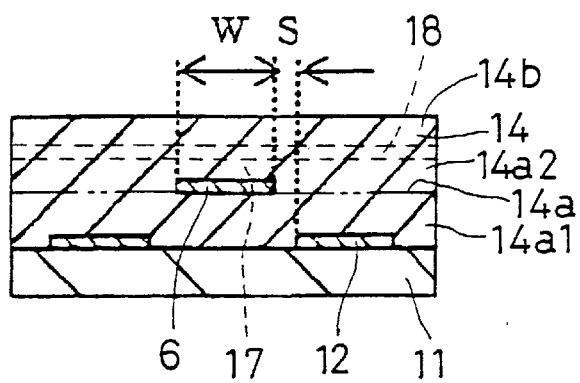
FIG. 3 is a sectional view taken along section line III—III of FIG. 2.
Figure 4:
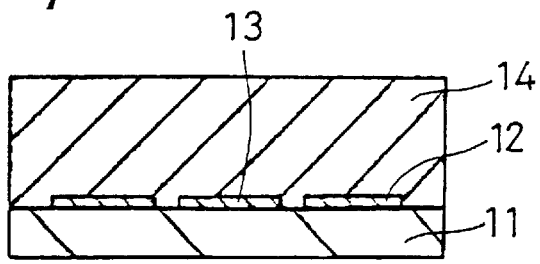
FIG. 4 is a sectional view taken along section line IV—IV of FIG. 2.

FIG. 2 is a perspective view of another embodiment of an optical integrated circuit substrate according to the invention, showing the internal structure thereof drawn in perspective; FIG. 3 is a sectional view taken along section line III—III of FIG. 2; and FIG. 4 is a sectional view taken along section line IV—IV of FIG. 2. In these figures, an optical integrated circuit substrate 20 includes: a substrate 11; an optical waveguide 19; a coplanar line 60; a metal electrode 16; and a thin-film optical element 17. The optical waveguide 19 includes a cladding 14 formed on the substrate 11 and a core 18 embedded in the cladding 14. The coplanar line 60 includes a signal line 13 with a divided portion 13c, acting as a line conductor, dividedly extending on the substrate 11, and grounding layers 12, acting as grounding conductors, formed on the substrate 11, the grounding layers 12 being located on both sides of the signal line 13 so as to extend in spaced parallel relation to each other.

The metal electrode 16 is arranged differently in level than the signal line 13, i.e. located at a predetermined distance away from the surface of the substrate 11, and is electrically connected to the signal line 13 so as to bring the divided signal line 13 into conduction. The thin-film optical element 17 is electrically connected to the metal electrode 16. Thus, the metal electrode 16 functions also as a metal placement portion for placing the thin-film optical element 17. The metal electrode 16 has its end portions 16a and 16b electrically connected via a through conductor 15 to the signal line 13's end portions 13a and 13b, respectively, that are arranged face to face with the divided portion 13c. The metal electrode 16 and the thin-film optical element 17 are embedded in the optical waveguide 19. A high-frequency electric signal fed from the signal line 13 of the coplanar line 60 is inputted via the through conductor 15 and the metal electrode 16 to the thin-film optical element 17. A high-frequency electric signal fed from the thin-film optical element 17 is outputted via the metal electrode 16 and the through conductor 15 to the signal line 13 of the coplanar line 60.

That is, in the optical integrated circuit substrate 20 of the invention, the grounding layers 12 of the coplanar line 60 are extendedly formed on the substrate 11 so as to be aligned with both sides of the metal electrode 16. In addition, a horizontal distance between the metal electrode 16 and the extendedly-formed grounding layer 12 (as indicated by symbol S in FIG. 3) is set to be smaller than a distance between the signal line 13 and the grounding layer 12 in the coplanar line 60.

The horizontal distance S between the metal electrode 16 and the extendedly-formed grounding layer 12 may be set as follows.

Figure 5:
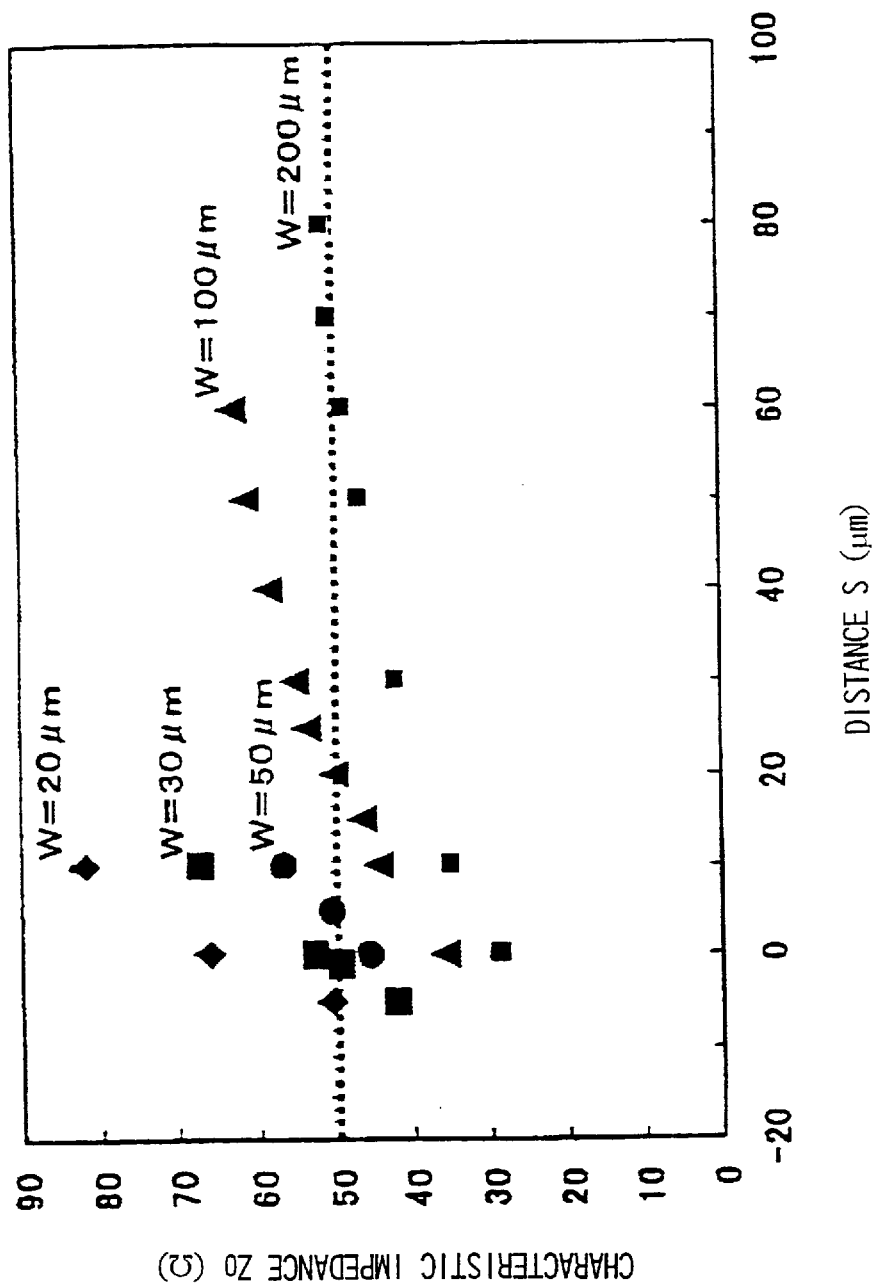
FIG. 5 is a chart showing examples of characteristic impedance that varies with a horizontal distance between a metal electrode and extendedly-formed ground layer provided in the optical integrated circuit substrate of the invention.

FIG. 5 is a chart showing examples of the relationship of the horizontal distance S between the metal electrode 16 at a frequency of 1 GHz and the extendedly-formed grounding layer 12 of the coplanar line 60a to the characteristic impedance $Z_0$ of the metal electrode 16. In FIG. 5, the horizontal distance S (unit: $\mu$m) between the metal electrode 16 and the grounding layer 12 is taken along the horizontal axis, and the characteristic impedance $Z_0$ (unit: Ω) of the metal electrode 16 is taken along the vertical axis. Note that negative values for the distance S represent a horizontal distance between the metal electrode 16's end portion and the grounding layer 12's end portion, as observed in a state where the grounding layer 12 is located below the metal electrode 16 so as to overlap one another. Each dot depicted in the figure represents a value for the characteristic impedance $Z_0$ which varies with the width (as indicated by symbol W in FIG. 3) of the metal electrode 16. Here, the width W is set at 20 $\mu$m, 30 $\mu$m, 50 $\mu$m, 100 $\mu$m, and 200 $\mu$m. As shown in FIG. 5, the relationship of the horizontal distance S between the metal electrode 16 and the extendedly-formed grounding layer 12 to the characteristic impedance $Z_0$ varies with the width W of the metal electrode 16. Hence, by optimizing the horizontal distance S between the metal electrode 16 and the extendedly-formed grounding layer 12 so as for the characteristic impedance $Z_0$ to reach a predetermined level, it is possible to match the characteristic impedance to the characteristic impedance $Z_0$ of the signal line 13 of the coplanar line 60 acting as an input/output transmission line. As is understood from a dotted line shown in FIG. 5, when the characteristic impedance is set at 50 Ω, the width W of the metal electrode 16 equals to 100 $\mu$m (indicated by a rectangular dot in FIG. 5) and the distance S equals to 20 $\mu$m.

Figure 6:
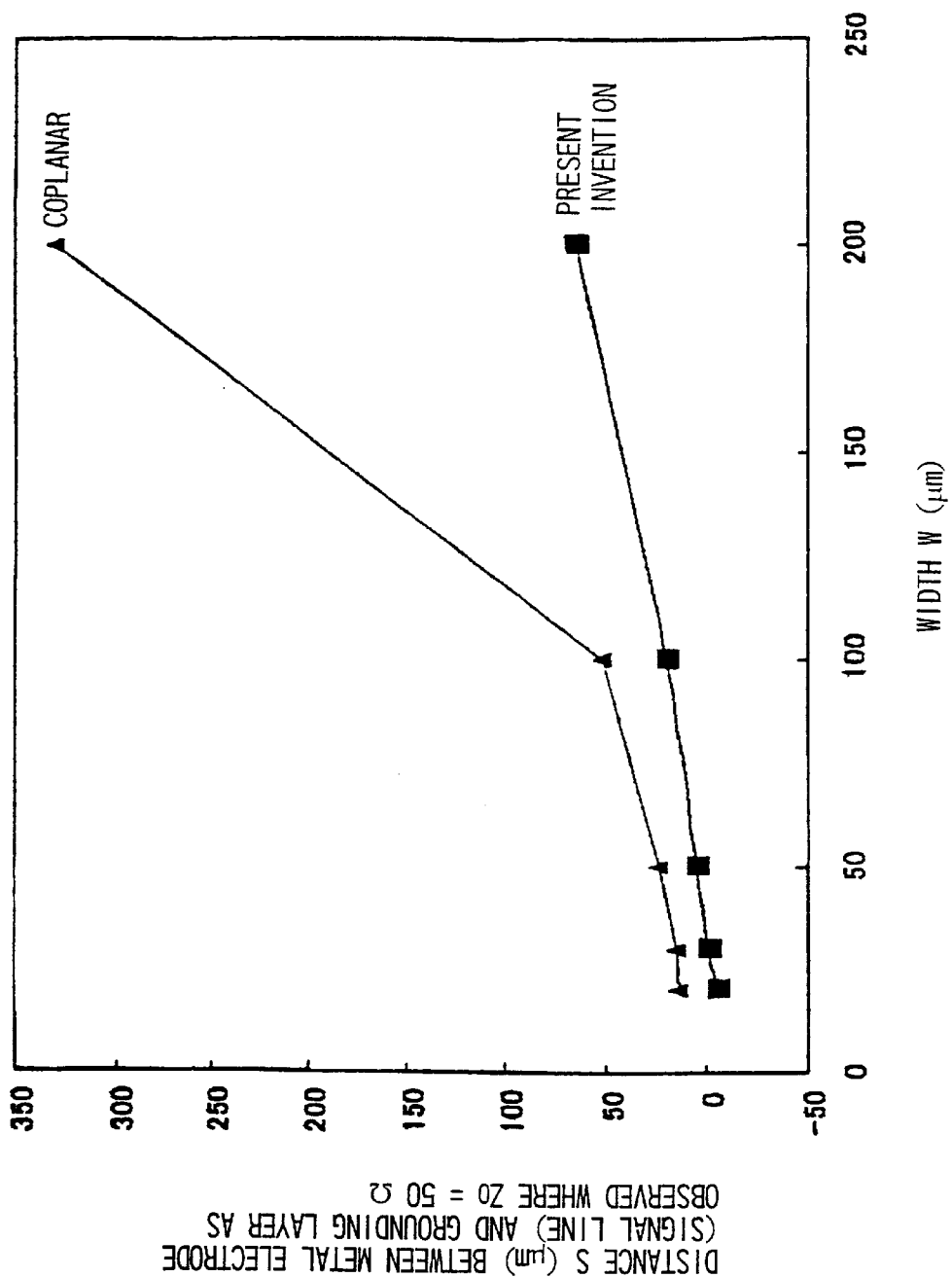
FIG. 6 is a chart showing examples of the horizontal distance between the metal electrode and the extendedly-formed ground layer of the optical integrated circuit substrate of the invention, as observed when characteristic impedance for the width of the metal electrode is set at 50 Ω.

Moreover, FIG. 6 is another chart showing examples of the relationship between the width W of the metal electrode 16 at a frequency of 1 GHz and the horizontal distance S between the metal electrode 16 and the extendedly-formed grounding layer 12, as observed in the case where the characteristic impedance $Z_0$ of the signal line 13 of the coplanar line 60 equals to 50 Ω. In FIG. 6, the width W (unit: $\mu$m) of the metal electrode 16 as a transmission line is taken along the horizontal axis, and the distance S (unit: $\mu$m) as observed where the characteristic impedance $Z_0$ of the metal electrode 16 equals to 50 Ω is taken along the vertical axis. Moreover, in the figure, a combination of a rectangular dot and a characteristic curve represents variation in the distance S with respect to the width W, and a combination of a triangular dot and a characteristic curve, as a comparative example, represents variation in the distance between the signal line 13 and the grounding layer 12 with respect to the width of the signal line 13 in the coplanar line 60. As shown in FIG. 6, the optimum value for the horizontal distance S between the metal electrode 16 and the extendedly-formed grounding layer 12 is relatively small, i.e. the horizontal distance S is narrower than the distance between the signal line 13 of the coplanar line 60 and the grounding layer 12. In this way, the optimum value for the horizontal distance S between the metal electrode 16 and the extendedly-formed grounding layer 12 may preferably be determined by performing electromagnetic field simulations or the like with consideration given to: materials used for the metal electrode 16, the optical waveguide 19, and the grounding layer 12; the thickness of the metal electrode 16, the optical waveguide 19, and the grounding layer 12; the width of the metal electrode 16; and frequencies of high-frequency electric signals inputted/outputted to the thin-film optical element 17.

In the optical integrated circuit substrate 20 of the invention, the substrate 11, which has photoelectric circuits formed thereon that includes an electric circuit and the optical waveguide 19, functions as a support substrate for the thin-film optical element 17 embedded in the optical waveguide 19. As the substrate 11 in question, it is possible to use various substrates designed to deal with optical signals, for example, an optical integrated circuit substrate, or an optical electronic type substrate. The examples thereof includes: a silicon substrate; an alumina substrate; a glass ceramic substrate; a multi-layer ceramic substrate; and a plastic electric wiring substrate.

The optical waveguide 19, which is formed on the substrate 11 and has the thin-film optical element 17 embedded thereinside, is built as a three-dimensionally shaped waveguide provided at least with a lower cladding 14a and a core 18, and preferably an upper cladding 14b formed thereon.

A material for use as the optical waveguide 19 should preferably be formable at a low temperature so as not to cause a damage to the signal line 13 of the coplanar line 60, the grounding layer 12, the through conductor 15, and the metal electrode 16 of which each is formed on the substrate 11, and to the thin-film optical element 17 placed on and electrically connected to the metal electrode 16, in laminating the optical waveguide 19 thereon; be excellent in planarizing characteristics so as to smooth out asperities created on the surface due to arrangement of the signal line 13, the grounding layer 12, the through conductor 15, the metal electrode 16, and the thin-film optical element 17; and be excellent in transparency so as to transmit light with lower losses. Moreover, of the cladding 14, particularly the lower cladding 14a functions also as a dielectric layer for electrical wiring in the optical integrated circuit substrate 20, and therefore it is particularly preferable to use a material which is low in dielectric losses and permittivity in preparation for high-frequency electric signals. Here, an optical material which can be applied to the substrate 11 as a solution is preferably used such as a siloxane polymer, fluorinated polyimide, fluorine resin, polymethylmethaacrylate (PMMA), or polycarbonate (PC).

As shown in FIG. 2, the optical integrated circuit substrate 20 of the invention is fabricated as follows. Firstly, on the substrate 11 is formed a coplanar line 60 including a signal line 13 with a divided portion 13c and grounding layers 12 formed on both sides of the signal line 13 with the divided portion 13c so as to extend in spaced parallel relation to each other. Secondly, on the substrate 11 is formed a first layer 14a1 constituting lower part of the lower cladding 14a of the cladding 14 of the optical waveguide 19 on which a metal electrode 16 is formed that serves also as a metal placement portion for placing the thin-film optical element 17. Thirdly, on the first layer 14a1 are formed a through conductor 15 connected to the signal line 13 formed on the substrate 1, and the metal electrode 16. Fourthly, the thin-film optical element 17 is placed or formed immediately on the metal electrode 16 so as to be electrically connected thereto. Fifthly, a second layer 14a2 is formed that constitutes upper part of the lower cladding 14a of the cladding 14. The second layer 14a2 covers the metal electrode 16 and the thin-film optical element 17. Sixthly, on the second layer 14a2 is formed a layer serving as the core 18. The layer is formed into a predetermined shape by means of a known fine-processing technique, such as photolithography or RIE (reactive ion etching), whereby the core 18 is formed. Lastly, after the core 18 is finished, a layer serving as the upper cladding 14b of the cladding 14 is formed by coating. Eventually, a three-dimensionally shaped optical waveguide 19 is realized. The optical waveguide 19 thus obtained is designed such that the metal electrode 16 and the thin-film optical element 17 are embedded in the optical waveguide 19.

The metal electrode 16, the through conductor 15, the signal line 13, and the grounding layer 12 are each preferably formed from a known thin-film wiring conductor material such as Au, Ti, Pd, Pt, Al, Cu, W, or Cr by means of known thin-film multi-layer wiring methods. The size and shape of the metal electrode 16 are determined in conformity with the size and shape of the electrode formed on the thin-film optical element 17 with consideration given to the previously-described width W and distance S. When formed as a light-receiving element, the thin-film optical element 17 is positioned in such a way that that the core 18 and the light-receiving surface are so arranged that electromagnetic field distribution of transmitted light is exerted upon the light-receiving surface. In a typical single mode optical waveguide, the distance between the core 18 and the light-receiving surface needs to be made at least 1.5 times or less as large as the thickness of the core 18. In reality, by performing simulations or tests with consideration given to the refractive index, transmittance, and thickness of the thin-film optical element 17; the structure, refractive index, and thickness of the optical waveguide 19; and the sensitivity of the light-receiving element, the positioning is so determined as to obtain intended light-receiving efficiency. By contrast, when formed as a light-emitting element, the thin-film optical element 17 is positioned in such a way that the light-emitting portion is arranged within the core 18 so as for optical signals to be fed to the core 18 with efficiency.

Moreover, prior to placement and connection of the thin-film optical element 17, a soldered layer such as AuSn or AuGe may be formed on the outer surface of the metal electrode 16, if it is necessary in cases where the thin-film optical element 17 is bonded or electrically connected to the metal electrode 16.

Moreover, in the example shown in FIG. 2, although the connection of the metal electrode 16 formed within the lower cladding 14a of the cladding 14 is established by the signal line 13 and through conductor 15 formed on the substrate 11, any other electric wiring structure may be adopted so long as it conforms to the specifications. For example, the metal electrode 16 may be electrically connected to the circuit wiring formed on the optical integrated circuit substrate 20 with multilayer wiring structure, or may be connected to the wiring formed on the optical waveguide 19.

As described hereinabove, since the thin-film optical element 17 is placed on and electrically connected to such a metal electrode 16, the stepped configuration created due to the arrangement of the thin-film optical element 17 can be made less prominent than in the construction disclosed as Practical example 3 in JP-A 7-128531. Specifically, the step height can be reduced to about 2 to 3 $\mu$m or below. Thus, when an optical waveguide layer is laminated on the thin-film optical element 17, the surface can be satisfactorily planarized. This significantly reduces scattering and radiation losses of light occurring in the vicinity of the thin-film optical element 17. Moreover, the core 18 of the optical waveguide 19 can be processed with high accuracy, so that excellent performance can be easily attained as designed.

The thin-film optical element 17 placed on the metal electrode 16 is formed as a thin-film light-receiving element or thin-film light-emitting element with use of a semiconductor material such as Si, Ge, InP, GaAs, InAs, or InGaAsP. Specifically, as a light-receiving element, a pn photodiode, a pin photodiode, a phototransistor, an MSM (Metal-Semiconductor-Metal) photodiode, an avalanche photodiode, or the like, and, as a light-emitting element, a light-emitting diode (LED), a vertical resonator type surface emitting laser, an edge emitting laser, or the like are used. Note that the thin-film optical element 17 mentioned here is defined as the one having a thickness smaller than that of the lower cladding 14a or the core 18 in which the thin-film optical element is embedded.

When formed as a surface-receiving type light-receiving element, the thin-film optical element 17 is so arranged that a field of light propagating around the core 18 is exerted upon its light-receiving surface; when formed as an edge-emitting type light-emitting element, the thin-film optical element 17 is arranged with its light-emitting portion located within the core 18; and, when formed as a waveguide type light-receiving element, the thin-film optical element 17 is so arranged that a field of light propagating around the core 18 is exerted upon its end face. Such arrangements allow the thin-film optical element 17 to be optically connected to the optical waveguide 19. In addition, when the thin-film optical element 17 has a waveguide structure, the core 18 and the waveguide portion formed within the thin-film optical element 17 may be arranged parallel to each other so as to achieve mode connection. Optical connection can also be achieved in this case.

The positional relationship between the thin-film optical element 17 embedded within the optical waveguide 19 and the core 18 of the optical waveguide 19; the height, width, and refractive index of the core 18; the thickness and refractive index of the lower cladding 14a; and the position of the core 18 in the cladding 14 are so determined as to obtain intended optical connection efficiency on the basis of known theory of an optical waveguide, or by performing simulations or tests with the light-receiving sensitivity of the thin-film optical element 17, intensity or mode field of transmitted light, or other into consideration.

Note that, as a method where by the thin-film optical element 17 is placed on and connected to the metal electrode 16, known thin-film element mounting methods may be adopted, for example, a technique described in "Thin-Film Multimaterial Optoelectronic Integrated Circuits" carried in "IEEE Transactions on Components, Packaging, and Manufacturing Technology, part B, Vol. 19, No. 1, February 1996".

[Practical Example]

Hereinafter, a description will be given as to a specific example of the optical integrated circuit substrate 20 embodying the invention.

Firstly, on a silicon substrate 11 are formed electric wiring constituted by a coplanar line 60 made of Ti/Pt/Au (thickness: 0.1 $\mu$m/0.2 $\mu$m/0.8 $\mu$m, respectively) and a pad for permitting connection to outside by means of photolithography, electronic beam deposition, and lift-off method.

Secondly, an organic solvent solution of a siloxane polymer is applied to the substrate 11 by a spin-coat method and subsequently heating treatment is performed thereon at 85° C. for 30 minutes and at 270° C. for 30 minutes, whereby an 8 $\mu$m-thick first layer 14a1 (refractive index=1.4405; and $\lambda$=1.3 $\mu$m) constituting part of the lower cladding 14a is formed. Thereafter, in the first layer 14a1 is formed a through hole by RIE processing with use of an opening pattern of an Al thin film as a mask. After the Al thin-film mask is removed, a Ti/Pt/Au thin film (thickness: 0.1 $\mu$m/0.2 $\mu$m/0.5 $\mu$m, respectively) is formed by means of electronic beam deposition, and then photolithography and dry-etching are performed thereon. Eventually, the metal electrode 16, serving also as a placement portion for the thin-film optical element 17, is realized that is electrically connected to the pad for permitting connection to outside by a conductor in the through hole.

Thirdly, as the thin-film optical element, an MSM thin-film light-receiving element 17, composed of a 1 $\mu$m-thick GaAs type material and a 0.2 $\mu$m-thick Au electrode, is mounted on and electrically connected to the metal electrode 16.

At this time, the horizontal distance between the metal electrode 16 and the grounding layer 12 of the coplanar line 60 extendedly formed on both sides of the metal electrode 16 is adjusted so that a characteristic impedance of the metal electrode 16 may equal to 50 $\Omega$. Specifically, the horizontal distance is set at: 65 $\mu$m for a 200 $\mu$m-wide metal electrode 16 (distance between a 200 $\mu$m-wide signal line 13 of the coplanar line 60 and the grounding layer 12 is set at 330 $\mu$m); 20 $\mu$m for a 100 $\mu$m-wide metal electrode 16 (distance between a 100 $\mu$m-wide signal line 13 of the coplanar line 60 and the grounding layer 12 is set at 52 $\mu$m); 4 $\mu$m for a 50 $\mu$m-wide metal electrode 16 (distance between a 50 $\mu$m-wide signal line 13 of the coplanar line 60 and the grounding layer 12 is set at 23 $\mu$m); $-2$ $\mu$m for a 30 $\mu$m-wide metal electrode 16 (distance between a 30 $\mu$m-wide signal line 13 of the coplanar line 60 and the grounding layer 12 is set at 14 $\mu$m); and $-5$ $\mu$m for a 20 $\mu$m-wide metal electrode 16 (distance between a 20 $\mu$m-wide signal line 13 of the coplanar line 60 and the grounding layer 12 is set at 13 $\mu$m).

Fourthly, an organic solvent solution of a siloxane polymer, which is the same material as used for the first layer 14a1 of the lower cladding 14a, is applied to the substrate 11 by a spin-coat method and subsequently heating treatment is performed thereon at 85° C. for 30 minutes and at 270° C. for 30 minutes, whereby a 10 $\mu$m-thick layer (refractive index=1.4405; and $\lambda$=1.3 $\mu$m) is formed. Thereafter, the entire surface thereof is subjected to etching by RIE processing using $CF_4$ gas and $O_2$ gas so as to give a thickness of 1 $\mu$m to a specific portion, which covers the thin-film optical element 17, of the second layer 14a2 constituting the remaining upper part of the lower cladding 14a. Hereupon, in the lower cladding 14a, the difference in height between the portion covering the thin-film optical element 17 and the other portion is kept as small as 0.3 $\mu$m or below and is thus considered immaterial. In the lower cladding 14a thus fabricated, the portion free of the thin-film optical element 17 has a thickness of about 11 $\mu$m.

Fifthly, a mixed solution of a siloxane polymer and tetra-n-butoxytitanium is spin-coated on the lower cladding 2, and is then heat-treated at 85° C. for 30 minutes and at 270° C. for 30 minutes, whereby a 7 $\mu$m-thick core 18 (refractive index=1.4450; and $\lambda$=1.3 $\mu$m) is formed.

Sixthly, a 0.5 $\mu$m-thick Al film is formed on the core 18 by means of sputtering, and a photo-resist pattern acting as a pattern for the core 18 is formed thereon by means of photolithography. Then, the Al film is subjected to etching using a mixed solution of phosphoric acid, acetatic acid, and nitric acid, whereby an Al pattern is formed onto which the resist-pattern is transferred.

After the resist is removed, the core 18 is subjected to etching by RIE processing using $CF_4$ gas and $O_2$ gas, whereby a 7 $\mu$m-wide and 7 $\mu$m-high core 18 having an approximately rectangular section is formed. This core 18 is located above the light-receiving portion of the thin-film light-receiving element 17.

After the Al pattern is removed, likewise as the foregoing, an upper cladding 14b (refractive index=1.4405; and $\lambda$=1.3 $\mu$m) is formed in which the core 18 is embedded. Eventually, a step-index type optical waveguide is realized that has a cladding 14 made of a siloxane polymer and a core 18 made of titanium-containing a siloxane polymer.

Lastly, excimer-laser abrasion treatment is performed so as to expose part of the pad for permitting connection to outside formed on the surface of the silicon substrate 11. Further, with use of a dicing blade, the substrate is cut into separate tip-like plates and is provided with a connection-permitting end face on which light coming from outside of the optical waveguide is incident.

In order to evaluate the light-transmission and light-receiving characteristics of the optical integrated circuit substrate 20 of the invention fabricated in that way, a laser light having a wavelength of 1.3 µm is fed via the single-mode optical waveguide to the end face for permitting connection to the optical waveguide.

As a result, it has been confirmed that, in a region of the optical waveguide 19 free of the thin-film light-receiving element 17, the thickness of the lower cladding 14a is made as large as 11 µm. This helps minimize the interaction between the lower cladding 14a and the underlying silicon substrate 11, so that low-loss and satisfactory light transmission is achieved. It has also been confirmed that the thin-film light-receiving element 17 receives light at about 10% efficiency, i.e. excellent optical connection efficiency can be attained.

Further, as a result of comparison between the optical integrated circuit substrate of the invention and another optical integrated circuit substrate which is fabricated in a similar manner but has no grounding layer corresponding to a metal placement portion, it has been confirmed that the former offers greater output strength for high-frequency signals than the latter.

Still further, as a result of comparison between the optical integrated circuit substrate of the invention and another optical integrated circuit substrate which is fabricated in a similar manner but has no grounding layer corresponding to a metal placement portion, in the former, an about 10% reduction in high-frequency signal reflection and an about 5% reduction in cross talk between adjacent signal lines have been observed.

It should be noted that the form of this invention herein shown and described is to be taken only as a preferred example, and the invention is not limited thereto. Accordingly, various changes and modifications may be made without departing from the spirit or scope of the invention. For example, the core 18 may be formed immediately on the surface of the thin-film light-receiving element 17 without providing therebetween the second layer 14a2 constituting the remaining upper part of the lower cladding 14a. Moreover, a grating may be formed in the second layer 14a2 of the lower cladding 14a between the thin-film light-receiving element 17 and the core 18 so as to obtain additional functions such as wavelength division.

Figure 7:
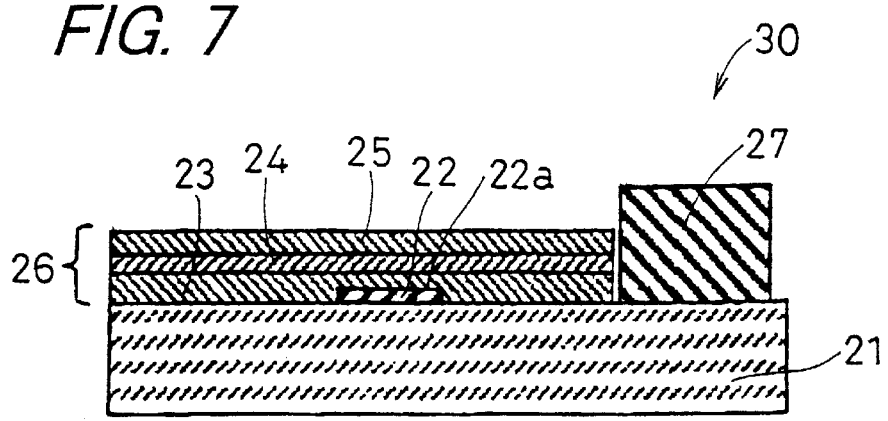
FIG. 7 is a sectional view of one embodiment of an optical module according to the invention.
Figure 8:
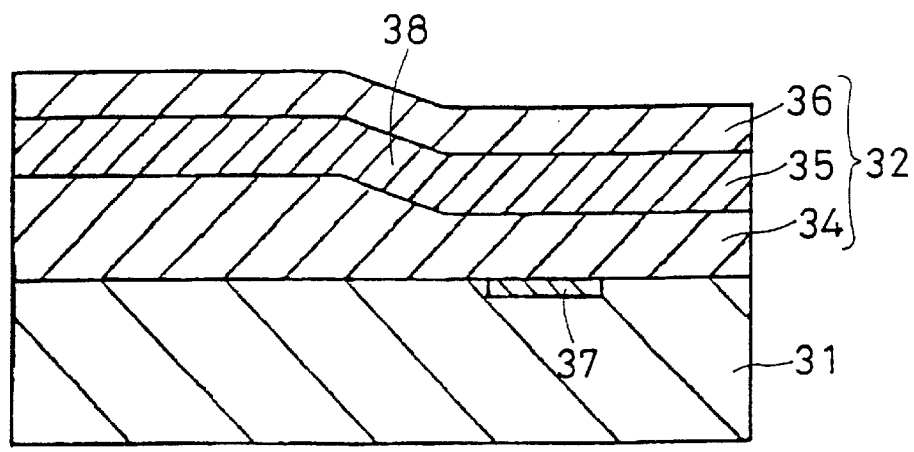
FIG. 8 is a sectional view of an example of a conventional optical integrated circuit substrate.
Figure 9:
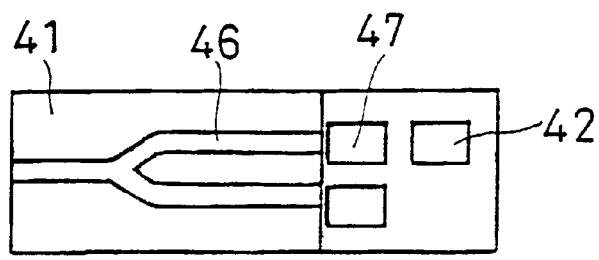
FIG. 9 is a plan view of an example of a conventional optical module.
Figure 10:
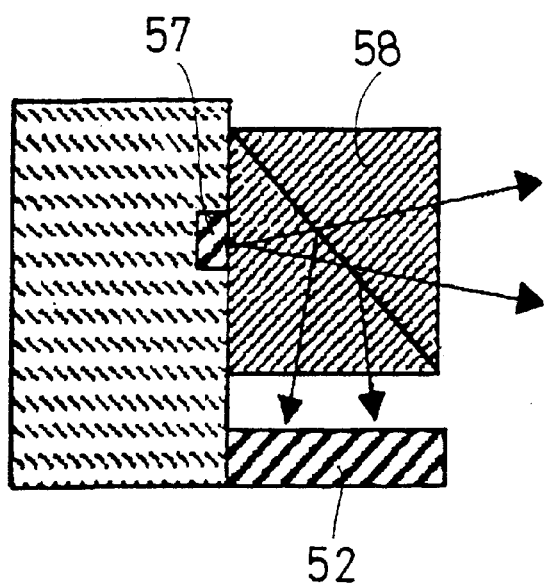
FIG. 10 is a sectional view of another example of a conventional optical module.

FIG. 7 is a sectional view showing one embodiment of an optical module according to the invention.

In an optical module 30 shown in FIG. 7, fixedly on a substrate 21 is disposed a monitoring semiconductor light-receiving element 22 with its light-receiving surface 22a arranged parallel to the substrate 21. Formed thereon is an optical waveguide 26 composed of a lower cladding 23, a core 24, and an upper cladding 25. Moreover, a semiconductor light-emitting element 27 is mounted on the substrate 21 so as to be optically connected to the optical waveguide 26. Of light to be transmitted through the optical waveguide 26, which is emitted from the semiconductor light-emitting element 27 as forward emitted light, a leakage light component from the core 24 is received and detected by the monitoring semiconductor light-receiving element 22. In this way, intensity of light emitted from the semiconductor light-emitting element 27 is detected and monitored.

In the optical module 30 of the invention, the substrate 21 has photoelectric circuits formed thereon that includes an electric circuit and the optical waveguide, and functions as a supporting substrate on which the thin-film semiconductor light-receiving element 22 is mounted. As the substrate 21 in question, it is possible to use various substrates designed to deal with optical signals, for example, an optical integrated circuit substrate, or a optical electronic type substrate. The examples thereof includes: a silicon substrate; an alumina substrate; a glass ceramic substrate; a multi-layer ceramic substrate; and a plastic electric wiring substrate.

The optical waveguide 26, formed on the substrate 21 and the semiconductor light-receiving element 22, is built as a three-dimensionally shaped optical waveguide composed of three layers. Specifically, the optical waveguide 26 is provided at least with a lower cladding 23 and a core 24 formed therewithin, and preferably an upper cladding 25 formed there on. As a material used for the optical waveguide 26, any other optical material may be used so long as it lends itself to forming an optical waveguide. Particularly, a siloxane polymer is desirable.

Assume that the optical waveguide 26 is made of a siloxane polymer. In this case, the lower and upper claddings 23 and 25 are made of a siloxane polymer, and the core 24 is made of a siloxane polymer containing metal, for example, titanium (Ti). By controlling the titanium content, in the optical waveguide 26, a desired refractive index difference can be obtained between the cladding (23 and 25) and the core 24. That is, it is possible to maximize the light-receiving efficiency of the semiconductor light-receiving element 22 with ease. Moreover, a siloxane polymer is readily formable at a low temperature ranging from about 100 to 300° C. Therefore, even in the case where the optical waveguide 26 is so formed as to embed the semiconductor light-receiving element 22, it never occurs that the semiconductor light-receiving element 22 suffers from thermal damage. Further, by using a siloxane polymer, excellent flatness and smoothness can be obtained in the film surface regardless of the surface condition of the underlying substrate. This makes it possible to smooth out asperities, which are created on the surface when the semiconductor light-receiving element 22 is embedded in the optical waveguide, causing scattering losses of light. Still further, in the optical waveguide made of a siloxane polymer, a residual stress on the film is kept as small as 20 MPa or below. This frees the semiconductor light-receiving element 22 from deterioration of characteristics, such as breakdown or a significant increase in dark currents, due to the residual stress.

As such a siloxane polymer material, resin having a polymer skeleton which contains siloxane linkage is preferably used. For example, polyphenylsilsesquioxane, polymethylphenylsilsesquioxane, or polydiphenylsilsesquioxane.

Moreover, metal to be contained in the core 24 and the claddings 23 and 25 is not limited to titanium, but maybe germanium (Ge), aluminum (Al), or erbium (Er). The core 24 containing such a metal component is realized by forming a siloxane polymer layer added with alcoxide of the metal and then giving the layer a predetermined shape and dimension.

Likewise as the core 24, the claddings 23 and 25 may be made of a siloxane polymer containing such a metal component. In this case, by controlling metal content, a desired refractive index difference can be obtained between the cladding (23 and 25) and the core 24.

Moreover, as the material of the optical waveguide 26, any other material may be used instead of a siloxane polymer so long as it has such transparency as to allow low-loss light transmission and lends itself to forming a combination of core and claddings that exhibits mutually-different refractive indices. For example, an optical material which can be used as a solution is preferably used, such as fluorinated polyimide, polymethylmethaacrylate (PMMA), or polycarbonate (PC). It is also possible to use an inorganic material, such as silica developed by a vapor phase epitaxy method.

According to the invention, in the optical waveguide 26 of the optical module 30, the difference in refractive index between the core 24 and the cladding (23 and 25) should preferably be kept in a range of 0.2 to 1.5% to prevent transmitted light from leaking outside of the optical waveguide 26 and to suppress dispersion due to difference in group delay in a multi-mode waveguide, and more preferably be kept in a range of 0.25 to 0.6% to obtain a good match in establishing connection with an external optical fiber.

Moreover, according to the invention, in the optical waveguide 26 of the optical module 30, since transmitted light propagates not only through the core 24 but also through the adjacent claddings 23 and 25, the thickness of each of the claddings 23 and 25 should preferably be made 1.5 times or above as large as that of the core 24 so as to achieve low-loss light transmission. For example, in the single-mode optical waveguide 26, the core 24 generally has a thickness of about 5 to 8 μm. With this into consideration, the claddings 23 and 25 should preferably each have at least a thickness of about 7.5 to 12 μm.

Further, in the optical waveguide 26, the smaller the thickness of the lower cladding 23 between the core 24 and the semiconductor light-receiving element 22, the greater the light-receiving efficiency can be. However, if the light-receiving efficiency is unduly great, light to be transmitted through the optical waveguide 26 is attenuated. To avoid this, the light-receiving efficiency should preferably be reduced to a degree that transmitted light can be monitored properly. In reality, the thickness of the lower cladding 23 is so determined as to obtain desired optical connection efficiency by conducting simulations or tests.

The semiconductor light-receiving element 22 disposed on the substrate 21 is fabricated with use of a semiconductor material such as Si, Ge, InP, GaAs, InAs, or InGaAsP. The examples thereof include a pn photodiode, a pin photodiode, a phototransistor, an MSM (Metal-Semiconductor-Metal) photodiode, and an avalanche photodiode. The semiconductor light-receiving element 22 may be hybridly or monolithically mounted on the substrate 21. Otherwise, it is possible to use a semiconductor light-receiving element embeddedly formed within the substrate 21 or an optical circuit formed on the substrate 21, i.e. a so-called built-in type semiconductor light-receiving element, or a typical semiconductor light-receiving element which is fixedly placed on the top surface of the upper cladding 25 of the optical waveguide 26 with its light-receiving surface arranged parallel to the core 24.

The semiconductor light-emitting element 27 is fabricated with use of a semiconductor material such as InP, GaAs, InAs, or InGaAsP. The examples thereof include a laser diode, a light-emitting diode (LED), a vertical resonator type surface emitting laser (VICSEL), and an edge emitting laser. The semiconductor light-emitting element 27 may be hybridly or monolithically mounted on the substrate 21.

[Practical example]

Next, a description will be given below as to a specific example of the optical module 30 embodying the invention.

Firstly, on an alumina substrate 21 is mounted a surface-receiving type semiconductor light-receiving element 22. Then, a step-index type optical waveguide 26 is formed thereon. The optical waveguide 26 has upper and lower claddings 25 and 23 made of a siloxane polymer and a core 24 made of titanium-containing a siloxane polymer. Subsequently, an edge-emitting type semiconductor light-emitting element 27 is mounted on the substrate 21 so as to be optically connected to the optical waveguide 26. In this way, an optical module 30 is fabricated that has basically the same structure as that of the embodiment of the invention shown in FIG. 7.

In this construction, the refractive index of the core 24 and that of each of the claddings 23 and 25 are set at 1.450 and 1.445, respectively. The core 24 is 7 μm in width and 7 μm in height. The thickness of the lower cladding 23 (distance from the top surface of the substrate 21 to the core 24 arranged parallel to the substrate 21) is set at 12 μm. The upper cladding 25 is 10 μm in thickness.

Note that, as the semiconductor light-receiving element 22, an MSM photodiode which is 2 μm in thickness and has a light-receiving area 200 μm in diameter is used. The MSM photodiode is placed on an electrode pad, which is about 3 μm in height and has a placement surface made of gold, with its MSM electrode surface facing downward. In this way, the lower cladding 23 between the semiconductor light-receiving element 22 and the core 24 is given a thickness of about 7 μm.

In the optical module of the invention fabricated in that way, the semiconductor light-emitting element 27 was driven to emit light, and the light emitted therefrom was transmitted through the optical waveguide 26. Then, a transmitted light leak from the core 24 was detected by the semiconductor light-receiving element 22 to measure the intensity of the transmitted light. As a result, it has been confirmed that the core 24 of the optical waveguide 26 and the semiconductor light-receiving element 22 are optically connected to each other at an optical-connection efficiency of about 5%. Therefore, transmitted light of sufficient intensity can be detected and effectively used as monitoring light for the forward light emitted from the semiconductor light-emitting element 27.

It should be noted that the form of this invention herein shown and described is to be taken only as a preferred example, and the invention is not limited thereto. Accordingly, various changes and modifications may be made without departing from the spirit or scope of the invention. For example, a surface-emitting type semiconductor light-emitting element may be used as the semiconductor light-emitting element 27. Moreover, the semiconductor light-emitting element 27 may be mounted via a ceramic or silicon sub carrier on the top surface or end face of the substrate 21.

What is claimed is:

1. An optical integrated circuit substrate comprising:
    a substrate;
    an optical waveguide formed on the substrate, the optical waveguide having a cladding and a core;
    a metal placement portion formed on the substrate; and
    a thin-film optical element placed on the metal placement portion,
    wherein the metal placement portion and the thin-film optical element are embedded in the optical waveguide.

2. The optical integrated circuit substrate of claim 1,
    wherein the optical waveguide is made of a siloxane polymer, fluorinated polyimide, fluorine resin, polymethylmethaacrylate (PMMA), or polycarbonate (PC).

3. The optical integrated circuit substrate of claim 1, wherein the metal placement portion is made of Au, Ti, Pd, Pt, Al, Cu, W, or Cr.

4. The optical integrated circuit substrate of claim 1, wherein on an outer surface of the metal placement portion is formed a soldered layer made of AuSn or AuGe.

5. The optical integrated circuit substrate of claim 1, wherein the thin-film optical element is built as a pn photodiode, a pin photodiode, a phototransistor, an MSM (Metal-Semiconductor-Metal) photodiode, an avalanche photodiode, a light-emitting diode, a vertical resonator type surface emitting laser, or an edge emitting laser.

6. An optical integrated circuit substrate comprising:

a substrate;

an optical waveguide formed on the substrate, the optical waveguide having a cladding and a core;

a coplanar line including a line conductor dividedly and extendedly formed on the substrate and grounding conductors formed on both sides of the line conductor so as to extend in spaced parallel relation to each other;

a metal electrode arranged differently in level than the line conductor, the metal electrode being electrically connected to the line conductor so as to bring the divided line conductor into conduction; and a thin-film optical element electrically connected to the metal electrode, wherein the metal electrode and the thin-film optical element are embedded in the optical waveguide, and wherein a horizontal distance between the metal electrode and the grounding conductor is made smaller than a horizontal distance between the line conductor and the grounding conductor.

7. The optical integrated circuit substrate of claim 6, wherein the optical waveguide is made of a siloxane polymer, fluorinated polyimide, fluorine resin, polymethylmethaacrylate (PMMA), or polycarbonate (PC).

8. The optical integrated circuit substrate of claim 6, wherein the metal electrode is made of Au, Ti, Pd, Pt, Al, Cu, W, or Cr.

9. The optical integrated circuit substrate of claim 6, wherein on an outer surf ace of the metal electrode is formed a soldered layer made of AuSn or AuGe.

10. The optical integrated circuit substrate of claim 6, wherein the thin-film optical element is built as a pn photodiode, a pin photodiode, a phototransistor, an MSM (Metal-Semiconductor-Metal) photodiode, an avalanche photodiode, a light-emitting diode, an vertical resonator type surface emitting laser, or an edge emitting laser.

11. An optical module comprising:

a substrate;

an optical waveguide formed on the substrate, the optical waveguide having a cladding and a core;

a semiconductor light-emitting element arranged on the substrate so as to be optically connected to the optical waveguide; and a semiconductor light-receiving element arranged on the substrate so as to be optically connected to the optical waveguide, the semiconductor light-receiving element detecting light to be transmitted through the optical waveguide, the transmitted light being emitted from the semiconductor light-emitting element, wherein the semiconductor light-receiving element is disposed in a vicinity of the core with its light-receiving surface arranged parallel to a surface of the substrate so as to receive a transmitted light leak from the core of the optical waveguide.

12. The optical module of claim 11, wherein the optical waveguide is made of a siloxane polymer, fluorinated polyimide, fluorine resin, polymethylmethaacrylate (PMMA), or polycarbonate (PC).

13. The optical module of claim 11, wherein the semiconductor light-receiving element is built as a pn photodiode, a pin photodiode, a phototransistor, an MSM (Metal-Semiconductor-Metal) photodiode, or an avalanche photodiode.

14. The optical module of claim 11, wherein the semiconductor light-emitting element is built as a laser diode, a light-emitting diode, a vertical resonator type surface emitting laser (VICSEL), or an edge emitting laser.

* * * * *